United States Patent
Oki et al.

(10) Patent No.: US 10,055,655 B2
(45) Date of Patent: Aug. 21, 2018

(54) TRAFFIC LIGHT DETECTION DEVICE AND TRAFFIC LIGHT DETECTION METHOD

(71) Applicant: Nissan Motor Co., Ltd., Yokohama-shi, Kanagawa (JP)

(72) Inventors: Takahiko Oki, Kanagawa (JP); Haruo Matsuo, Kanagawa (JP); Daiki Yamanoi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/564,023

(22) PCT Filed: Apr. 8, 2015

(86) PCT No.: PCT/JP2015/060988
§ 371 (c)(1),
(2) Date: Oct. 3, 2017

(87) PCT Pub. No.: WO2016/162975
PCT Pub. Date: Oct. 13, 2016

(65) Prior Publication Data
US 2018/0137379 A1     May 17, 2018

(51) Int. Cl.
*G06K 9/00* (2006.01)
*G06K 9/78* (2006.01)
(Continued)

(52) U.S. Cl.
CPC ....... *G06K 9/00825* (2013.01); *G06K 9/4604* (2013.01); *G06K 9/78* (2013.01);
(Continued)

(58) Field of Classification Search
CPC .... G06K 9/00825; G06K 9/4604; G06K 9/78; G06T 7/74; G06T 7/60; G06T 2207/30252
See application file for complete search history.

(56) References Cited

U.S. PATENT DOCUMENTS

2010/0214488 A1* 8/2010 Higuchi ............... G09G 3/3611
348/699
2012/0119666 A1* 5/2012 Adamowicz ....... H05B 41/2928
315/224
(Continued)

FOREIGN PATENT DOCUMENTS

DE   102012104131 A1   11/2012
JP   2005301518 A   10/2005
(Continued)

*Primary Examiner* — Amara Abdi
(74) *Attorney, Agent, or Firm* — Young Basile Hanlon & MacFarlane, P.C.

(57) ABSTRACT

A traffic light detection device uses an image pickup unit mounted on a vehicle to extract, from an image taken of surroundings of the vehicle, synchronized pixels, whose brightness changes in synchronization with an alternating current period of electric power supplied to a traffic light, and detects the traffic light from the synchronized pixels. The traffic light detection device is provided with: a positional variation calculation unit that calculates positional variation amounts of continuously extracted positions of the synchronized pixels; and a signal lamp determination unit that determines, as a signal lamp candidate, the synchronized pixels whose positional variation amount is equal to or smaller than a threshold value.

10 Claims, 9 Drawing Sheets

(51) Int. Cl.
    *G06T 7/60*          (2017.01)
    *G06T 7/73*          (2017.01)
    *G06K 9/46*         (2006.01)

(52) U.S. Cl.
    CPC ............... *G06T 7/60* (2013.01); *G06T 7/74* (2017.01); *G06T 2207/30252* (2013.01)

(56) References Cited

U.S. PATENT DOCUMENTS

| | | |
|---|---|---|
| 2014/0098997 A1 | 4/2014 | Faber et al. |
| 2017/0041591 A1* | 2/2017 | Korogi ............... G06K 9/00818 |

FOREIGN PATENT DOCUMENTS

| | | | | |
|---|---|---|---|---|
| JP | 2006-101235 | * | 4/2006 | ............ H04N 5/235 |
| JP | 2007286943 | * | 11/2007 | ............... G06T 1/00 |
| JP | 2007286943 A | | 11/2007 | |
| JP | 2008-134916 | * | 6/2008 | ............ B60R 21/00 |
| JP | 2008134916 A | | 6/2008 | |
| JP | 2008293277 | * | 12/2008 | ......... G08G 1/09623 |
| JP | 2008293277 A | | 12/2008 | |
| JP | 2012-173879 | * | 9/2012 | ............... G06T 1/00 |
| JP | 2012168592 | * | 9/2012 | ............... G06T 1/00 |
| JP | 2012168592 A | | 9/2012 | |
| JP | 2012173879 A | | 9/2012 | |
| KR | 20100029149 A | | 3/2010 | |
| KR | 20120088771 A | | 8/2012 | |

\* cited by examiner

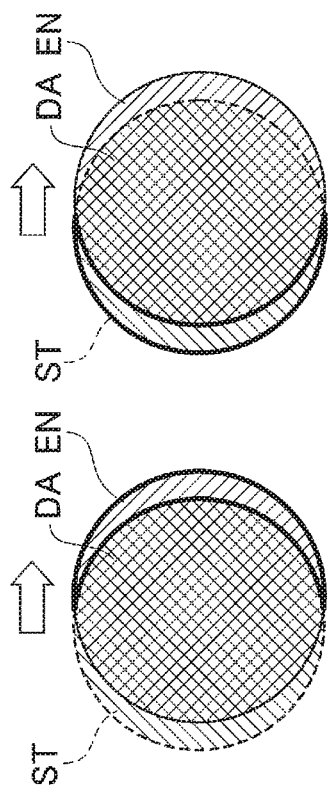
FIG. 5A
FIG. 5C
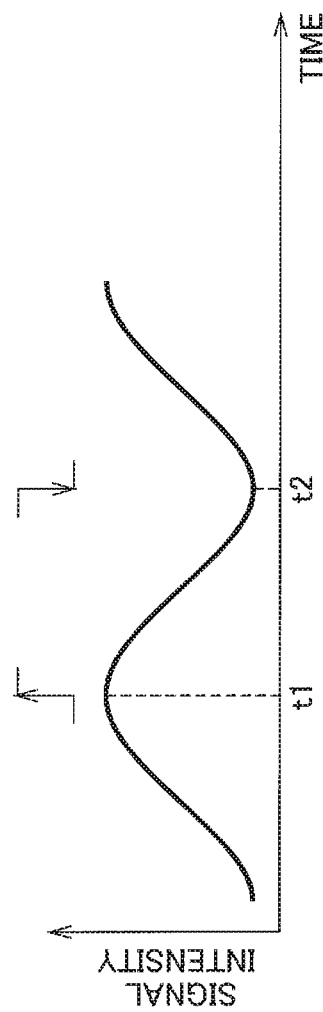
FIG. 5D
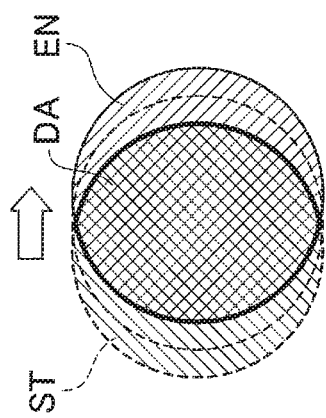
FIG. 5B

TRAFFIC LIGHT DETECTION DEVICE AND TRAFFIC LIGHT DETECTION METHOD

TECHNICAL FIELD

The present invention relates to a traffic light detection device and a traffic light detection method.

BACKGROUND

There has heretofore been known a traffic light detection device that detects a traffic light from an image taken by a camera (see Japanese Patent Application Publication No. 2005-301518). In Japanese Patent Application Publication No. 2005-301518, a signal lamp candidate is detected from the image based on the color and shape of a signal lamp, and it is determined whether or not the signal lamp candidate is flashing with a predetermined period.

When a vehicle equipped with a camera is on the move, positions of brightness edges included in an image taken in motion also move. Thus, step responses of brightness occur in regions where the brightness edges have moved, thus generating noise having wide frequency components. When pixels whose brightness changes with a predetermined period are extracted as a signal lamp, the noise having wide frequency components is erroneously recognized as the signal lamp in some cases.

SUMMARY

The present invention has been made to solve the foregoing problem, and it is an object of the present invention to provide a traffic light detection device and a traffic light detection method which are capable of accurately detecting a signal lamp by suppressing erroneous detection of a step response of brightness as a signal lamp even when brightness edges move.

A traffic light detection device according to an aspect of the present invention uses an image pickup unit that is mounted on a vehicle to take images of surroundings of the vehicle, thereby acquiring the taken images, extracts synchronized pixels, whose brightness changes in synchronization with an alternating current period of electric power supplied to a traffic light from the taken images, and detects the traffic light from the synchronized pixels. The traffic light detection device includes: a positional variation calculation unit that calculates positional variation amounts of continuously extracted positions of the synchronized pixels; and a signal lamp determination unit that determines, as a signal lamp candidate, the synchronized pixels whose positional variation amount is equal to or smaller than a threshold value.

DETAILED DESCRIPTION OF THE DRAWINGS

Figure 1:
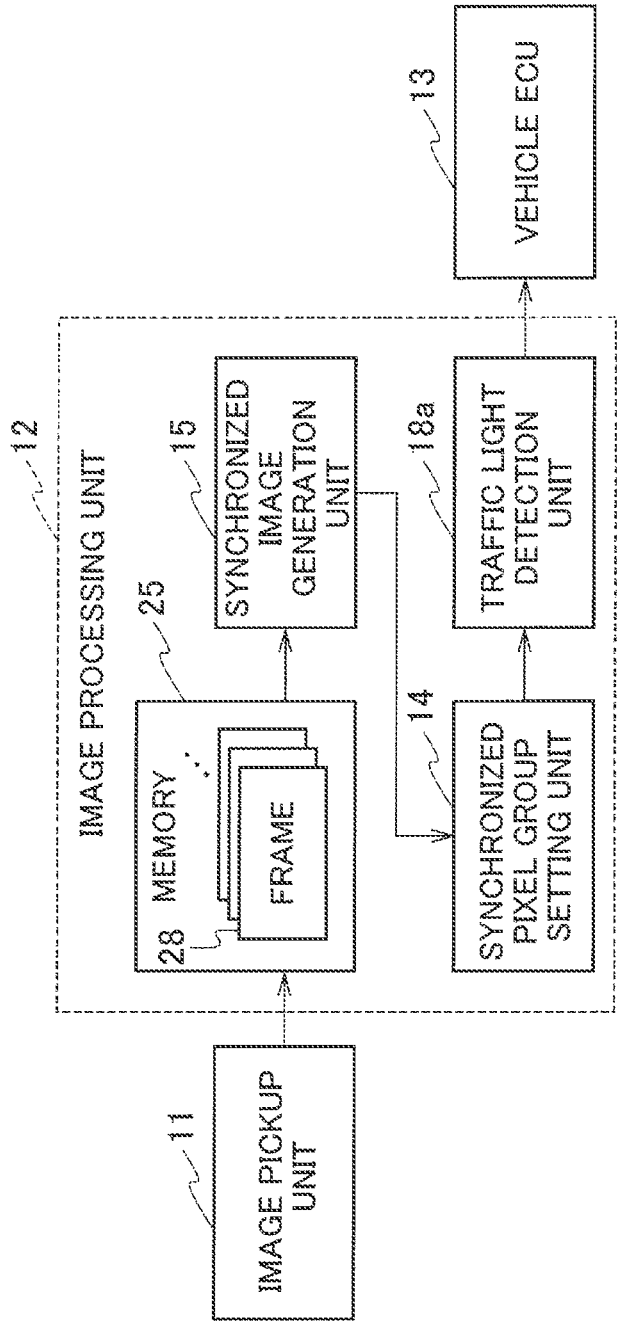
FIG. 1 is a block diagram showing an overall configuration of a traffic light detection device according to a first embodiment.
Figure 4C:
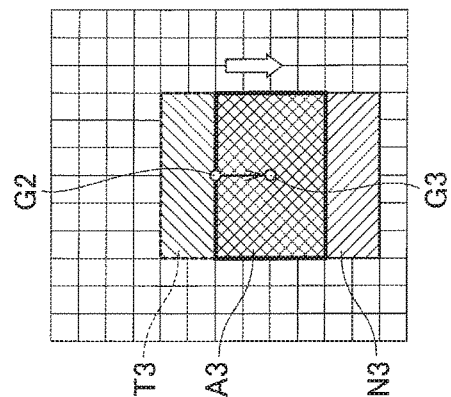
Figure 4B:
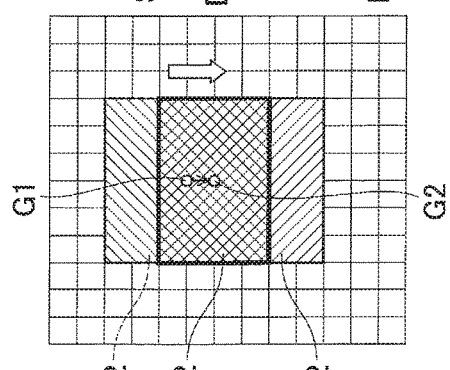
Figure 4A:
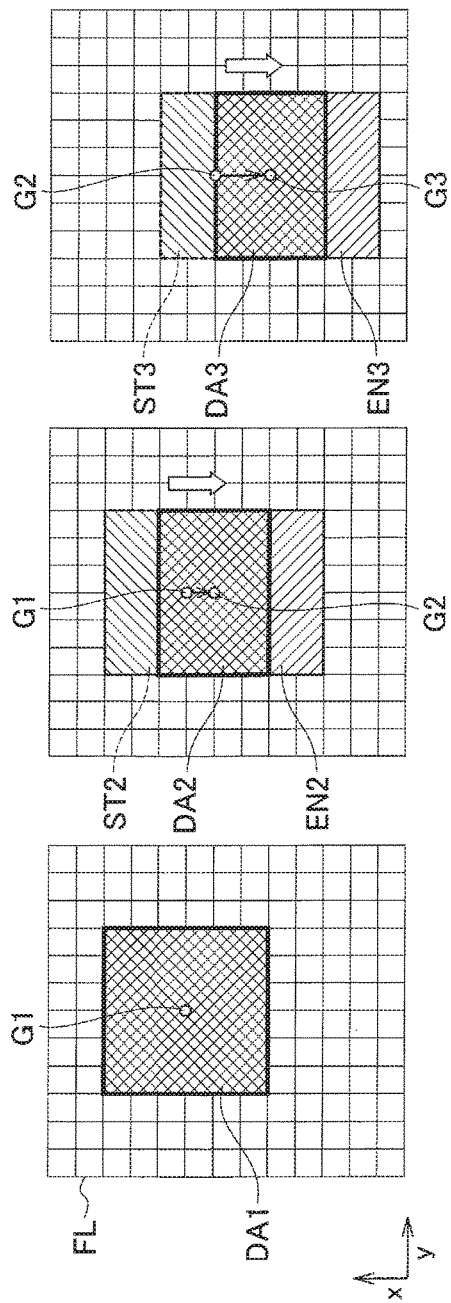
Figure 4F:
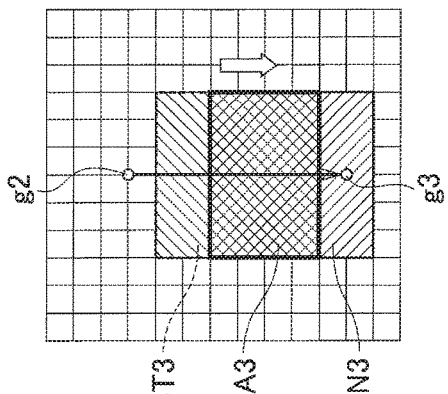
Figure 4E:
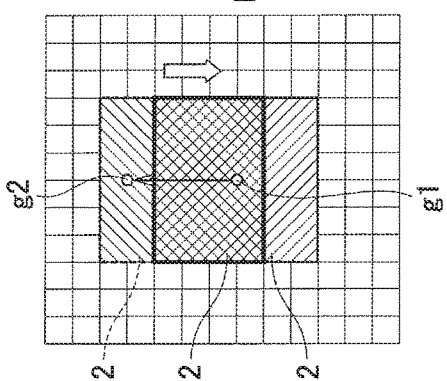
Figure 4D:
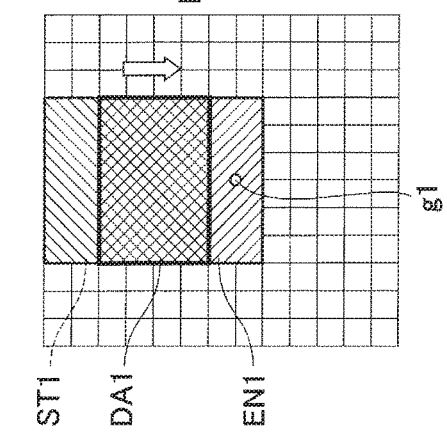
Figure 6:
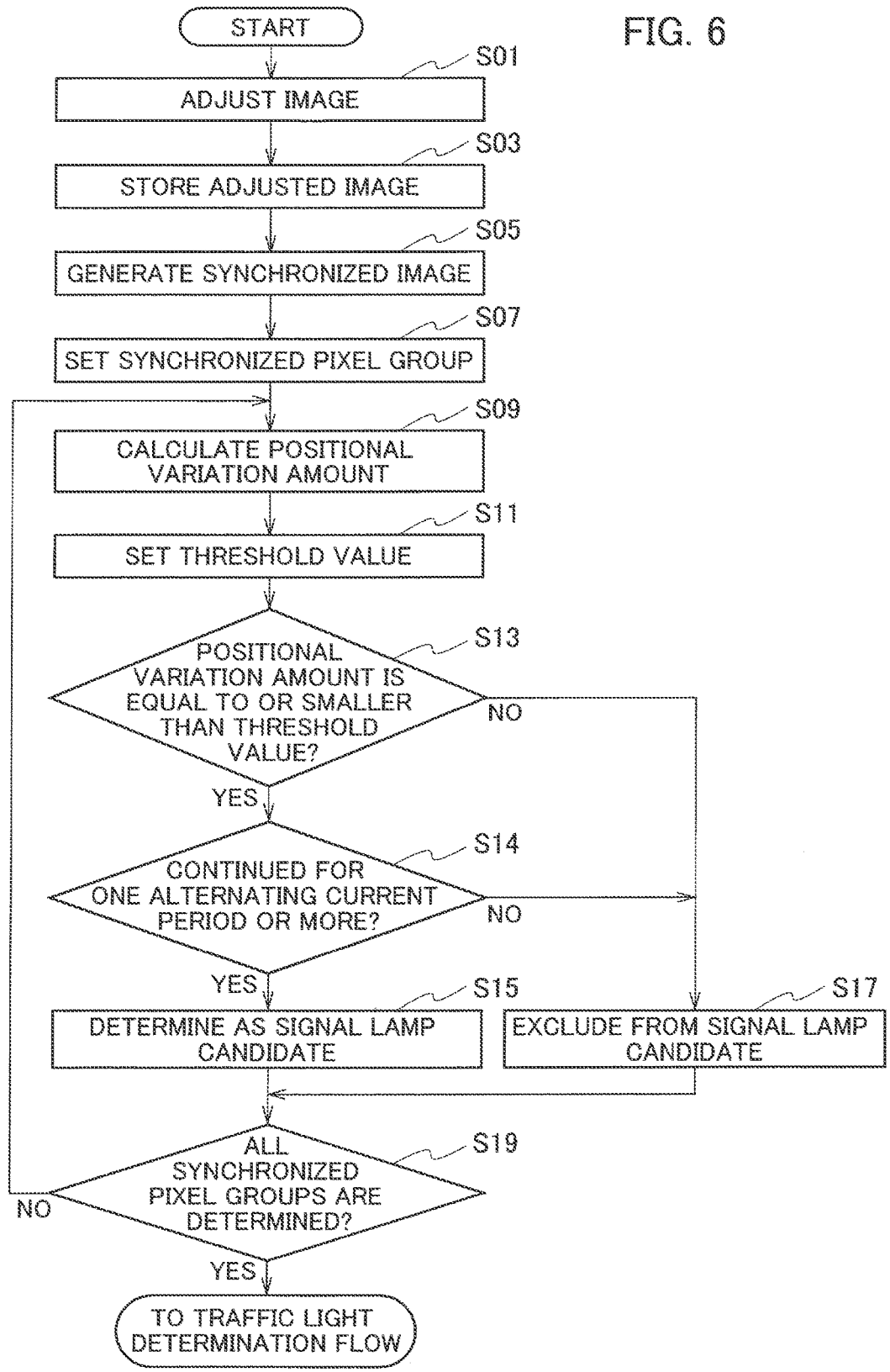
Figure 7:
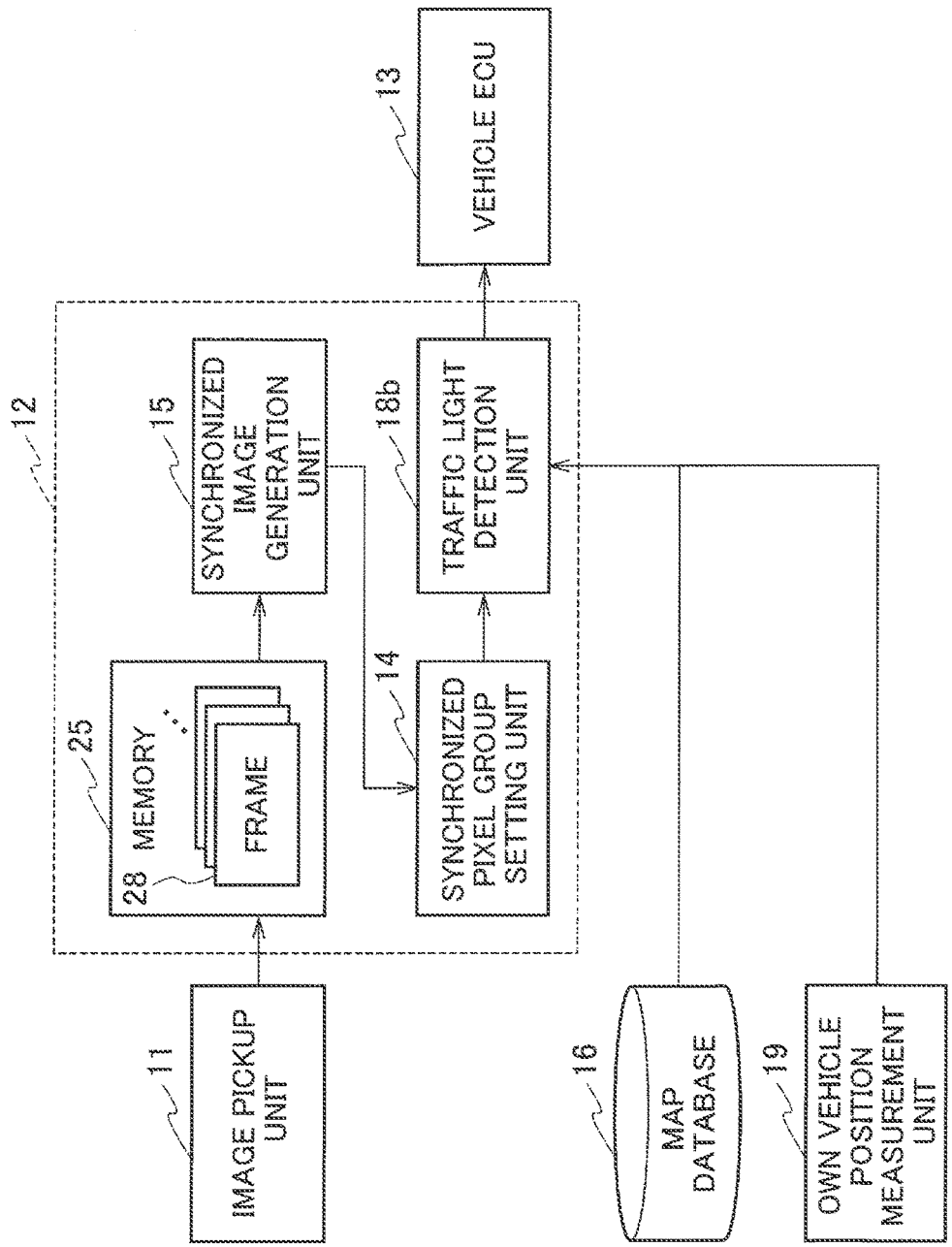
Figure 8:
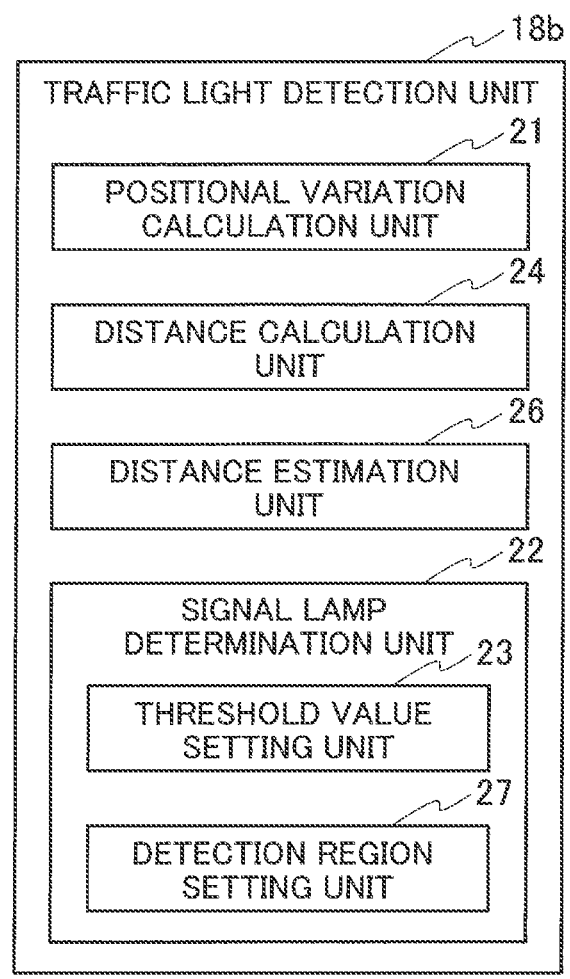
Figure 9:
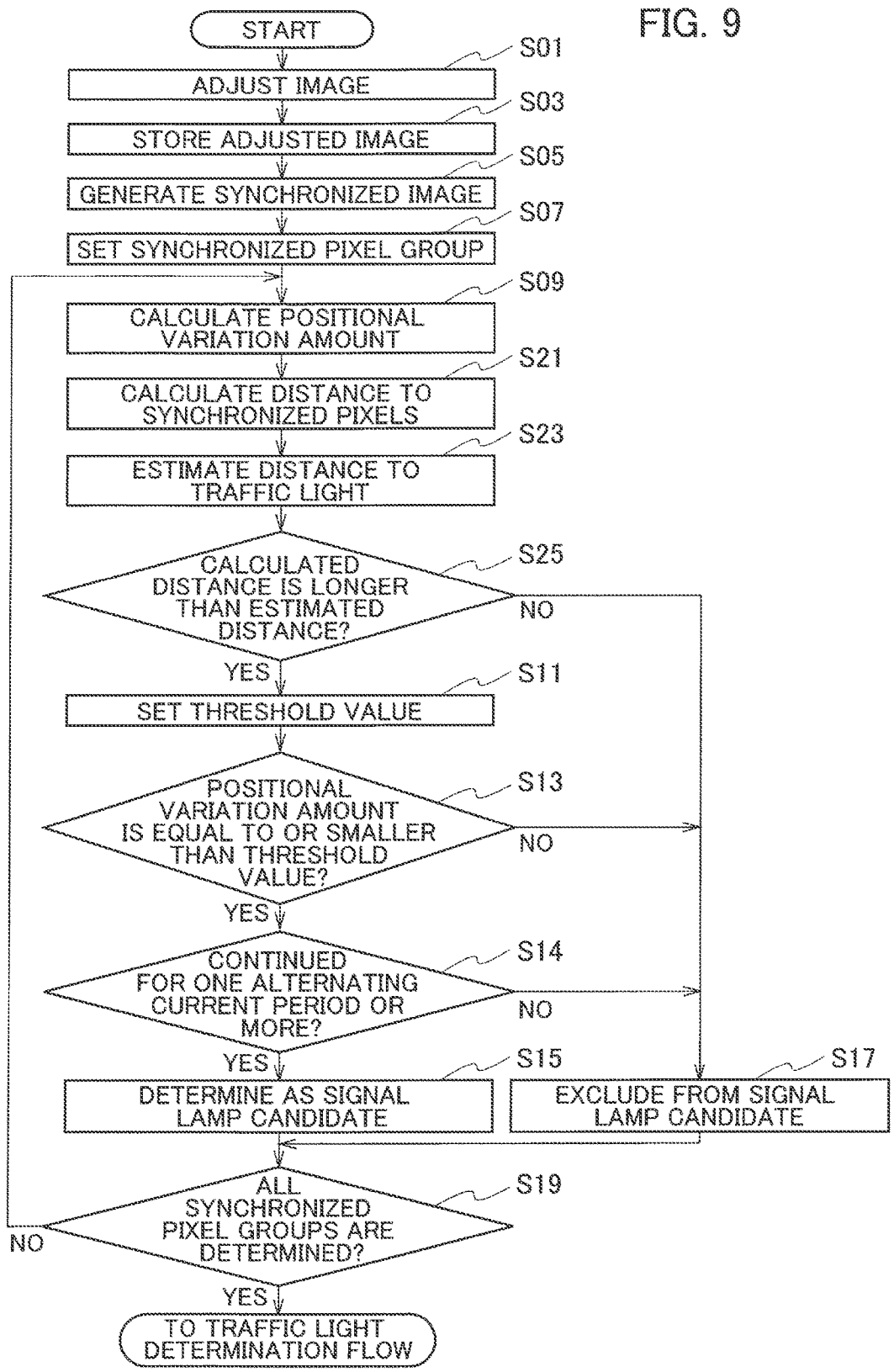

FIGS. 4(a) to 4(c) are conceptual diagrams, each showing how an overlapping portion DA of a signal lamp moving in an X-axis direction is extracted as synchronized pixels, and FIGS. 4(d) to 4(f) are conceptual diagrams, each showing how, in another lamp, a step response from ON to OFF and a step response from OFF to ON are alternately extracted as synchronized pixels;

FIGS. 5(a), 5(c), and 5(d) are conceptual diagrams, each showing how the position of a high brightness region has moved to the right from a region ST to a region EN within a synchronized image generation cycle, and FIG. 5(b) is a graph showing a rise time t1 and a fall time t2 of a reference signal synchronous with the phase of electric power supplied to the traffic light;

FIG. 6 is a flowchart showing an example of a traffic light detection method using the traffic light detection device shown in FIG. 1;

FIG. 7 is a block diagram showing an overall configuration of a traffic light detection device according to a second embodiment;

FIG. 8 is a block diagram showing a detailed configuration of a traffic light detection unit 18b shown in FIG. 7; and FIG. 9 is a flowchart showing an example of a traffic light detection method using the traffic light detection device shown in FIG. 7.

DETAILED DESCRIPTION OF THE EMBODIMENTS

First Embodiment

Next, embodiments of the present invention are described in detail with reference to the drawings.

With reference to FIG. 1, description is given of an overall configuration of a traffic light detection device according to a first embodiment. The traffic light detection device includes: an image pickup unit 11 that is mounted on a vehicle to acquire images by taking images of surroundings of the vehicle; and an image processing unit 12 that detects a traffic light from the images acquired by the image pickup unit 11.

The image pickup unit 11 is a camera equipped with a solid-state image sensing device, for example, a CCD or a CMOS, and acquires color images that can be subjected to image processing. The image pickup unit 11 repeatedly takes images in front of the vehicle at predetermined time intervals, thus acquiring a plurality of continuous images (frames). The image pickup unit 11 takes images more than once during one alternating current period of electric power supplied to the traffic light.

The image processing unit 12 receives the images acquired by the image pickup unit 11, and detects the traffic light from the images. Information of the detected traffic light is transferred to another processing unit (vehicle ECU 13) mounted on the vehicle, including a controller for realizing automated driving of the vehicle, for example. The image processing unit 12 includes a microcontroller including a CPU, a memory 25, and an input-output unit, for example, and constitutes a plurality of information processors included in the traffic light detection device by executing pre-installed computer programs. The image processing unit 12 repeatedly executes a series of information processing cycles (including synchronized image generation processing) for detecting the traffic light from the image, by the unit of a plurality of continuous taken images (frames). The image processing unit 12 may also serve as an ECU used for other controls related to the vehicle.

The memory 25 simultaneously stores a plurality of images (frames) 28 taken by the image pickup unit 11. For example, the memory 25 stores the plurality of images 28 taken during one to three alternating current periods of the electric power supplied to the traffic light. The synchronized image generation processing is performed by the unit of the plurality of taken images 28 thus stored.

The plurality of information processors included in the image processing unit 12 include a synchronized image generation unit 15, a synchronized pixel group setting unit 14, and a traffic light detection unit 18a.

Figure 2:
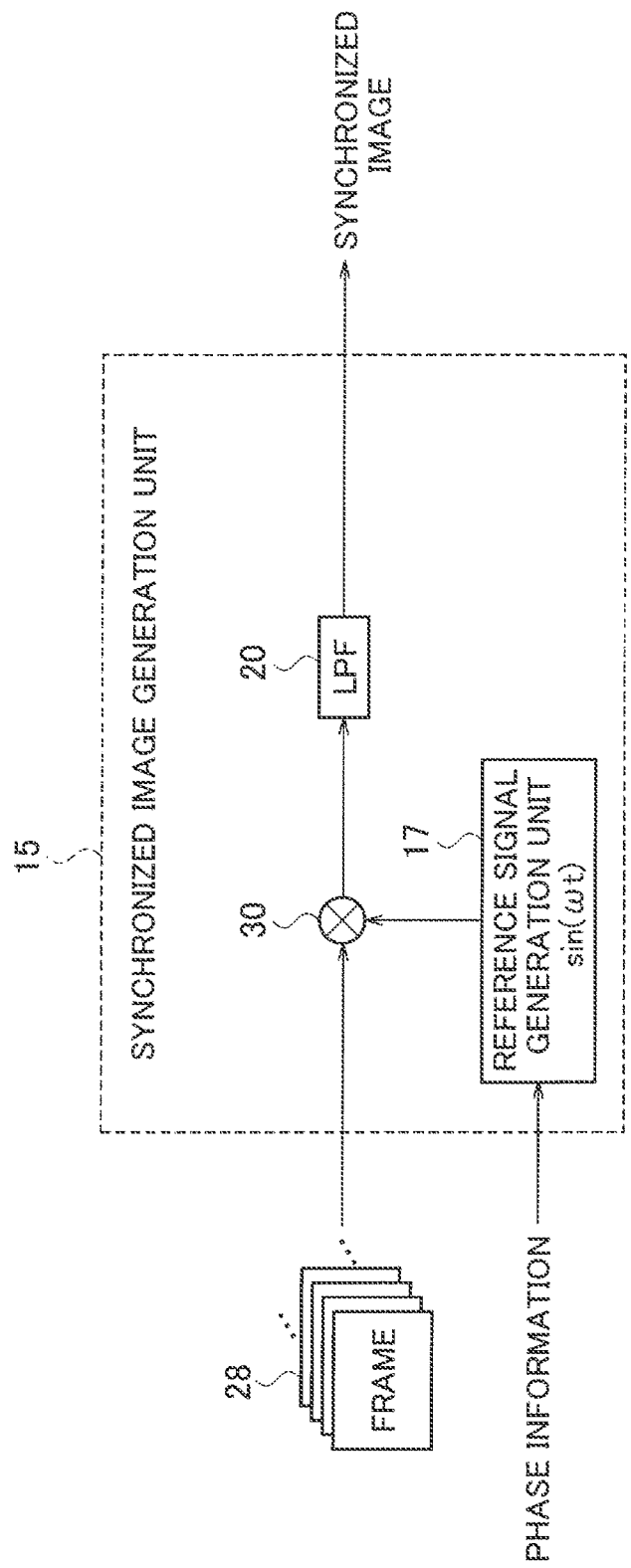
FIG. 2 is a block diagram showing a detailed configuration of a synchronized image generation unit 15 shown in FIG. 1.

The synchronized image generation unit 15 acquires phase information of an electric power system around the vehicle, including the traffic light. Then, the synchronized image generation unit 15 uses the phase information of the electric power system to extract synchronized pixels, whose brightness changes in synchronization with the alternating current period of the electric power, from the taken images. Thus, the synchronized image generation unit 15 generates a synchronized image including the extracted synchronized pixels. To be more specific, as shown in FIG. 2, the synchronized image generation unit 15 includes a reference signal generation unit 17, a multiplication unit 30, and a low-pass filter (LPF) 20.

The reference signal generation unit 17 uses the phase information of the electric power system (commercial power source) to generate a reference signal synchronous with the phase of the electric power supplied to the traffic light. The multiplication unit 30 multiplies the reference signal by a brightness signal of each of the pixels in the taken image (frame) 28 read from the memory 25. The multiplication unit 30 performs the above multiplication processing on each of the plurality of taken images simultaneously stored in the memory 25. The LPF 20 takes only low-frequency components out of the result of the multiplication by the multiplication unit 30, by reducing frequency components higher than a predetermined cutoff frequency, and outputs a synchronized image including the synchronized pixels.

The electric power supplied to the traffic light is alternating-current power obtained by full-wave rectifying the power from the commercial power source. The brightness of the signal lamp turned on upon receipt of the power supplied from the commercial power source changes with the same period as the period (for example, 100 Hz) of the full-wave rectified alternating-current power. Therefore, the synchronized pixels, whose brightness changes in synchronization with the alternating current period of the electric power supplied to the traffic light, are extracted from the taken image 28.

The synchronized pixel group setting unit 14 sets a plurality of synchronized pixels detected in a predetermined region, as one synchronized pixel group, that is, recognizes a set of a plurality of synchronized pixels as one synchronized pixel group. To be more specific, the synchronized pixel group setting unit 14 sets a plurality of adjacent synchronized pixels as one synchronized pixel group, that is, recognizes a cluster of a plurality of synchronized pixels as one synchronized pixel group. For example, a plurality of synchronized pixels included in a region where the density of the synchronized pixels is higher than a predetermined reference value are set as one synchronized pixel group.

Figure 3:
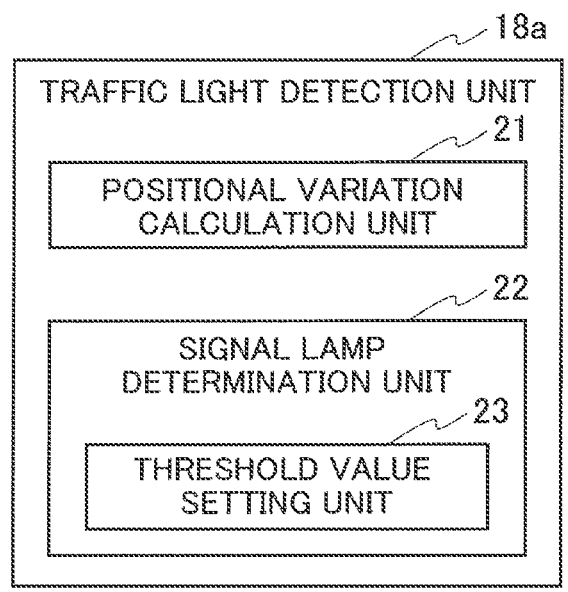
FIG. 3 is a block diagram showing a detailed configuration of a traffic light detection unit 18a shown in FIG. 1.

The traffic light detection unit 18a extracts a signal lamp that is turned on from the synchronized pixels, and detects a traffic light including the signal lamp. As shown in FIG. 3, the traffic light detection unit 18a includes at least: a positional variation calculation unit 21 that calculates positional variation amounts of continuously extracted positions of the synchronized pixels; and a signal lamp determination unit 22 that determines, as a signal lamp candidate, the synchronized pixels whose positional variation amount is equal to or smaller than a threshold value.

The positional variation calculation unit 21 calculates the position of the center of gravity of the synchronized pixel group set by the synchronized pixel group setting unit 14, and calculates the movement amount of the continuously extracted positions of the center of gravity as a positional variation amount. The signal lamp determination unit 22 determines a synchronized pixel group whose positional variation amount is equal to or smaller than a threshold value, as a signal lamp candidate. The signal lamp determination unit 22 adjusts the threshold value according to the area of the synchronized pixel group. To be more specific, the larger the area of the synchronized pixel group, the larger the threshold value. Furthermore, when a synchronized pixel group whose positional variation amount is equal to or smaller than the threshold value is continuously generated for a threshold time or more by the synchronized image generation unit 15, the signal lamp determination unit 22 determines the synchronized pixel group as the signal lamp candidate. For example, one period of the electric power supplied to the traffic light may be set as the threshold time.

In addition, the traffic light detection unit 18a determines whether or not the hue of the signal lamp candidate determined by the signal lamp determination unit 22 is similar to the hue of the signal color, and also determines the degree of circularity of the signal lamp candidate. Lamps to be turned on upon receipt of electric power supplied from the commercial power source include other lamps lighted on a street, such as street lamps, vending machines, and signs, in addition to the signal lamps included in the traffic light. The signal lamp candidates may also include such other lamps. The traffic light detection unit 18a determines similarity in hue between the signal lamp candidates and the signal colors, and also determines the degrees of circularity of the signal lamp candidates. Thus, the traffic light detection unit 18a can detect a signal lamp and a traffic light including the signal lamp by excluding such other lamps from the signal lamp candidates.

Next, with reference to FIGS. 4 and 5, description is given of the reason why the synchronized pixel group whose positional variation amount is equal to or smaller than the threshold value can be determined as the signal lamp candidate.

When the own vehicle equipped with the image pickup unit 11 is on the move, the position of a high brightness region included in an image taken in motion also moves. The high brightness region includes tail lamps (brake lamps and turn signal lamps) of a leading vehicle and head lamps of an oncoming vehicle, for example, besides the signal lamp that is turned on. Even when the own vehicle stops, the positions of the tail lamps of the leading vehicle and the head lamps of the oncoming vehicle also move as the other surrounding vehicles move.

The positions of brightness edges also move as the position of the high brightness region moves. Thus, step responses of brightness occur in regions (ST and EN) where the brightness edges have moved, thus generating noise having wide frequency components. When pixels whose brightness changes with a predetermined period are extracted as synchronized pixels, the noise having wide frequency components is erroneously extracted as the synchronized pixels.

When the position of the high brightness region changes within a synchronized image generation cycle for the synchronized image generation unit 15 to generate synchronized images, the positions of the pixels extracted as the synchronized pixels change depending on whether or not the brightness in the high brightness region changes with the predetermined period.

FIGS. 5(a), 5(c), and 5(d) each show how the position of the high brightness region has moved to the right from a region ST to a region EN within a synchronized image generation cycle. FIG. 5(a) shows a case where the high brightness region is a signal lamp whose brightness changes with a predetermined period (alternating current period of the commercial power source). FIGS. 5(c) and 5(d) each show a case where the high brightness region is any of other lamps whose brightness does not change with the predetermined period. The "other lamps" include, for example, the tail lamps of the leading vehicle and the head lamps of the oncoming vehicle. In the case of FIG. 5(a), since the brightness of the high brightness region itself changes with the alternating current period of the commercial power source, an overlapping portion DA between the region ST and the region EN is extracted as synchronized pixels. On the other hand, in the cases of FIGS. 5(c) and 5(d), since the brightness of the overlapping portion DA between the region ST and the region EN does not periodically change, the overlapping portion DA is not extracted. However, the portion obtained by excluding the overlapping portion DA from the regions ST and EN is a portion where the brightness edges have moved. Therefore, step responses of brightness occur and noise having wide frequency components is generated. Thus, the portion obtained by excluding the overlapping portion DA from the regions ST and EN is erroneously extracted as the synchronized pixels whose brightness changes with the alternating current period of the commercial power source.

Furthermore, as shown in FIG. 5(b), a step response from OFF to ON is extracted as synchronized pixels at a rise time t1 of a reference signal synchronous with the phase of the electric power supplied to the traffic light. The step response from OFF to ON occurs in a portion obtained by excluding the overlapping portion DA from the region EN. However, a step response from ON to OFF is not extracted as synchronized pixels. Therefore, as shown in FIG. 5(c), at the time t1, the portion obtained by excluding the overlapping portion DA from the region EN is erroneously extracted as the synchronized pixels whose brightness changes with the alternating current period of the commercial power source.

On the other hand, a step response from ON to OFF is extracted as synchronized pixels at a fall time t2 of the reference signal. The step response from ON to OFF occurs in a portion obtained by excluding the overlapping portion DA from the region ST. However, a step response from OFF to ON is not extracted as synchronized pixels. Therefore, as shown in FIG. 5(d), at the time t2, the portion obtained by excluding the overlapping portion DA from the region ST is erroneously extracted as the synchronized pixels whose brightness changes with the alternating current period of the commercial power source.

Therefore, when another lamp whose brightness does not change with a predetermined period keeps moving in the same direction, the synchronized pixels shown in FIGS. 5(c) and 5(d) are alternately and repeatedly extracted. Therefore, when the high brightness region is such another lamp whose brightness does not change with the predetermined period, continuously extracted positions of the synchronized pixels significantly change, and thus are neither stable nor uniform. On the other hand, when the high brightness region is the signal lamp whose brightness changes with the alternating current period of the commercial power source, the overlapping portion DA is extracted as the synchronized pixels. Thus, continuously extracted positions of the synchronized pixels hardly change, and thus are stable and uniform.

FIGS. 4(a) to 4(c) show how an overlapping portion DA of a signal lamp moving in an X-axis direction is extracted as synchronized pixels. FIGS. 4(d) to 4(f) show how, in another lamp, a step response from ON to OFF and a step response from OFF to ON are alternately extracted as synchronized pixels. A lattice frame (FL) in FIGS. 4(a) to 4(f) represents a frame composed of a plurality of pixels arranged in a matrix, and each lattice frame represents pixels of an image pickup device. A region of 6 pixels in the X-axis direction by 6 pixels in the Y-axis direction corresponds to the signal lamp or another lamp.

In the synchronized image generation cycle shown in FIG. 4(a), the signal lamp does not move. Therefore, the entire signal lamp corresponds to an overlapping portion DA1 and is extracted as synchronized pixels. It is assumed that the center of gravity of the overlapping portion DA1 is G1. Then, in the synchronized image generation cycle shown in FIG. 4(b), the signal lamp moves by 2 pixels in the X-axis direction. Therefore, an overlapping portion DA2 thereof is a region of 4 pixels in the X-axis direction by 6 pixels in the Y-axis direction. The center of gravity (G2) of the overlapping portion DA2 in this extraction moves by 1 pixel in the X-axis direction from the center of gravity (G1) in the previous extraction. Thereafter, in the synchronized image generation cycle shown in FIG. 4(c), again, the signal lamp moves by 2 pixels in the X-axis direction. Therefore, an overlapping portion DA3 thereof is a region of 4 pixels in the X-axis direction by 6 pixels in the Y-axis direction. The center of gravity (G3) of the overlapping portion DA3 in this extraction moves by 2 pixels in the X-axis direction from the center of gravity (G2) in the previous extraction.

On the other hand, in the synchronized image generation cycle shown in FIG. 4(d), another lamp moves by 2 pixels in the X-axis direction. The synchronized image generation cycle shown in FIG. 4(d) is synchronous with the rise time t1 of the reference signal. Therefore, a portion where a step response from OFF to ON occurs, that is, a portion obtained by excluding the overlapping portion DA1 from a region EN1 is extracted as synchronized pixels. The portion obtained by excluding the overlapping portion DA1 from the region EN1 is a region of 2 pixels in the X-axis direction by 6 pixels in the Y-axis direction, and it is assumed that the center of gravity thereof is g1. In the synchronized image generation cycle shown in FIG. 4(e), another lamp moves by 2 pixels in the X-axis direction. The synchronized image generation cycle shown in FIG. 4(e) is synchronous with the fall time t2 of the reference signal. Therefore, a portion where a step response from ON to OFF occurs, that is, a portion obtained by excluding the overlapping portion DA2 from a region ST2 is extracted as synchronized pixels. The portion obtained by excluding the overlapping portion DA2 from the region ST2 is a region of 2 pixels in the X-axis direction by 6 pixels in the Y-axis direction, and the center of gravity (g2) in this extraction moves by 4 pixels in the X-axis direction from the center of gravity (g1) in the previous extraction. In the synchronized image generation cycle shown in FIG. 4(f), another lamp moves by 2 pixels in the X-axis direction. The synchronized image generation cycle shown in FIG. 4(f) is synchronous with the rise time t1 of the reference signal. Therefore, as in the case of FIG. 4(d), a portion obtained by excluding the overlapping portion DA3 from a region EN3 is extracted as synchronized pixels. The portion obtained by excluding the overlapping portion DA3 from the region EN3 is a region of 2 pixels in the X-axis direction by 6 pixels in the Y-axis direction, and the center of gravity (g3) in this extraction moves by 8 pixels in the X-axis direction from the center of gravity (g2) in the previous extraction.

As described above, depending on whether the synchronized pixels are the signal lamp or another lamp, there is a significant difference in positional variation amount on the image of synchronized pixels. To be more specific, when the synchronized pixels are the signal lamp, the positional variation amount of the continuously extracted centers of gravity (G1 to G3) of the synchronized pixels is small between continuous synchronized image generation cycles. On the other hand, when the synchronized pixels are another lamp, the positional variation amount of the continuously extracted centers of gravity (G1 to G3) of the synchronized pixels is large between continuous synchronized image generation cycles. Therefore, if a threshold value can be properly set for the positional variation amounts of the continuous extracted positions of the synchronized pixels (or the center of gravity of the synchronized pixel group), signal lamp candidates can be accurately determined by excluding another lamp from the synchronized pixels.

The threshold value is adjusted according to the area of the synchronized pixel group. For example, half the size of the extracted synchronized pixel group may be set as the threshold value. In the example of FIGS. 4(b) and 4(c), the rectangular region of 4 pixels in the X-axis direction by 6 pixels in the Y-axis direction is extracted as the synchronized pixel group. Half the lengths in the X-axis and Y-axis directions, that is, 2 pixels in the X-axis direction by 3 pixels in the Y-axis direction may be set as the threshold value. Thus, the synchronized pixel groups (DA2 and DA3) shown in FIGS. 4(b) and 4(c) are determined as the signal lamp candidates. On the other hand, in the example of FIGS. 4(d) to 4(f), the rectangular region of 2 pixels in the X-axis direction by 6 pixels in the Y-axis direction is extracted as the synchronized pixel group. Half the lengths in the X-axis and Y-axis directions, that is, 1 pixel in the X-axis direction by 3 pixels in the Y-axis direction may be set as the threshold value. Thus, the synchronized pixel groups shown in FIGS. 4(d) to 4(f) are excluded from the signal lamp candidates. As described above, the threshold value may be set such that the larger the area of the synchronized pixel group, the larger the threshold value.

With reference to FIG. 6, description is given of an example of a traffic light detection method using the traffic light detection device shown in FIG. 1. To be more specific, description is given of an example of a series of information processing cycles for detecting a traffic light from an image, which is executed by the image processing unit 12 shown in FIG. 1. The information processing cycle shown in a flowchart of FIG. 6 is started as an ignition switch of the vehicle is turned on and the traffic light detection device is started, and is repeatedly executed with a predetermined period until the traffic light detection device is stopped.

First, in Step S01, the image processing unit 12 adjusts a positional relationship between taken images, based on an offset amount set in the previous information processing cycle, that is, a shift direction and a shift amount of the taken images. Thus, blurring between the taken images is corrected.

Then, the processing advances to Step S03 where the image processing unit 12 stores the taken images, whose positions have been adjusted, in the memory 25. Thereafter, in Step S05, the synchronized image generation unit 15 uses the phase information of the electric power system to extract synchronized pixels, whose brightness changes in synchronization with the alternating current period of the electric power supplied to the traffic light, from the taken images whose positions have been adjusted, and generates a synchronized image composed of the extracted synchronized pixels.

Subsequently, the processing advances to Step S07 where the synchronized pixel group setting unit 14 sets a set of a plurality of synchronized pixels as a synchronized pixel group. As a matter of course, a plurality of synchronized pixel groups may be set in one synchronized image. Then, in Step S09, the positional variation calculation unit 21 calculates the positions of the center of gravity (G1 to G3, g1 to g3) of the synchronized pixel group set by the synchronized pixel group setting unit 14, and calculates a movement amount of the continuously extracted positions of the center of gravity (G1 to G3, g1 to g3) as a positional variation amount. In other words, the movement amount of the positions of the center of gravity of the synchronized pixels between the synchronized image generation cycles is calculated as the positional variation amount.

Thereafter, the processing advances to Step S11 where the signal lamp determination unit 22 adjusts the threshold value according to the area of the synchronized pixel group, as described with reference to FIG. 4. Then, in Step S13, the signal lamp determination unit 22 determines whether or not the positional variation amount of the synchronized pixel group is equal to or smaller than the threshold value. If the positional variation amount is equal to or smaller than the threshold value (YES in S13), the processing advances to Step S14. On the other hand, if the positional variation amount is not equal to or smaller than the threshold value (NO in S13), the processing advances to Step S17 where the signal lamp determination unit 22 excludes the synchronized pixel group from the signal lamp candidates, and then advances to Step S19.

In Step S14, the signal lamp determination unit 22 determines whether or not the synchronized pixels whose positional variation amount is equal to or smaller than the threshold value are continuously generated by the synchronized image generation unit 15 for more than one period of the electric power supplied to the traffic light. If the generation is continued for more than one period (YES in S14), it can be determined that the synchronized pixel groups are temporally stably detected. Thus, the processing advances to Step S15 where the signal lamp determination unit 22 determines the synchronized pixel group as the signal lamp candidate, and then advances to Step S19. On the other hand, if the generation is not continued for more than one period (NO in S14), the synchronized pixel groups are not temporally stably detected. Thus, the processing advances to Step S17 to exclude the synchronized pixel group from the signal lamp candidates.

In Step S19, it is determined whether or not determination is made for all the synchronized pixel groups set in S07. If the determination is not made for all the synchronized pixel groups (NO in S19), the processing returns to Step S09 to perform the above determination processing for the remaining synchronized pixel groups. On the other hand, if the determination is made for all the synchronized pixel groups (YES in S19), the flow of FIG. 6 is terminated. Thereafter, the traffic light detection unit 18a determines similarity in hue between the signal lamp candidates and the signal colors, and also determines the degrees of circularity of the signal lamp candidates. Thus, the traffic light detection unit 18a detects a signal lamp and a traffic light including the signal lamp by excluding such other lamps from the signal lamp candidates.

As described above, the first embodiment can achieve the following advantageous effects.

A step response of brightness occurs in a region where the brightness edge has moved, thus generating noise having wide frequency components. Therefore, the synchronized image generation unit 15 may extract the moved portion of the brightness edge as the synchronized pixels. When the synchronized pixels extracted by the synchronized image generation unit 15 correspond to the moved portion of the brightness edge, the positions of the synchronized pixels on the image are not stable, and a variation amount between the synchronized images (synchronized image extraction cycle) is relatively large. On the other hand, when the synchronized pixels extracted by the synchronized image generation unit 15 correspond to the signal lamp, the positions of the synchronized pixels on the image are stable, and a variation amount between the synchronized image extraction cycles is relatively small. Therefore, the signal lamp determination unit 22 extracts the synchronized pixels whose positional variation amount is equal to or smaller than the threshold value, as the signal lamp candidate. Thus, the synchronized pixels whose positional variation amount is larger than the threshold value are excluded from the signal lamp candidates. Accordingly, the signal lamp can be accurately detected by suppressing erroneous extraction of step responses of brightness as the signal lamp candidate even when the brightness edges of the tail lamps of the leading vehicle, the head lamps of the oncoming vehicle or the like move on the taken image.

The synchronized pixel group setting unit 14 sets a plurality of synchronized pixels detected within a predetermined region as one synchronized pixel group. The positional variation calculation unit 21 calculates a variation amount of the position of the center of gravity of the synchronized pixel group, as a positional variation amount. Thus, the positional variation amount can be accurately obtained.

The synchronized pixel group setting unit 14 sets a plurality of adjacent synchronized pixels as one synchronized pixel group. Thus, a cluster of a plurality of synchronized pixels can be recognized as one synchronized pixel group. Therefore, the signal lamp can be accurately detected.

The signal lamp determination unit 22 adjusts the threshold value according to the area of the synchronized pixel group. Thus, an appropriate threshold value can be set according to the size of the synchronized pixel group.

When synchronized pixels whose positional variation amount is equal to or smaller than the threshold value are continuously generated for a threshold time or more by the synchronized image generation unit 15, the signal lamp determination unit 22 determines the synchronized pixels as the signal lamp candidate. When synchronized pixels are continuously extracted for at least one alternating current period or more, the synchronized pixels are determined as the signal lamp candidate. Thus, the temporally stably extracted synchronized pixels can be set as the signal lamp candidate. Therefore, the signal lamp can be accurately detected.

Second Embodiment

With reference to FIG. 7, description is given of an overall configuration of a traffic light detection device according to a second embodiment. The traffic light detection device of FIG. 7 further includes a map database 16 and an own vehicle position measurement unit 19, in addition to the configuration shown in FIG. 1. Note that functions of a traffic light detection unit 18b are different from those of the traffic light detection unit 18a, and thus description thereof is given later with reference to FIG. 8. The map database 16 stores positional information of a traffic light to be detected. The positional information of the traffic light may include information of a height from the ground, in addition to two-dimensional coordinate information. The own vehicle position measurement unit 19 is, for example, a GPS (global positioning system) receiver that receives a signal from a GPS satellite to detect the current position of a vehicle. The positional information of the traffic light and information of the current position of the vehicle are transferred to the traffic light detection unit 18b. Other than the above, an image pickup unit 11, a memory 25, a synchronized image generation unit 15, a synchronized pixel group setting unit 14, and a vehicle ECU 13 are the same as those shown in FIG. 1, and description thereof is omitted.

The traffic light detection unit 18b extracts a signal lamp that is turned on from synchronized pixels, and detects a traffic light including the signal lamp. As shown in FIG. 8, the traffic light detection unit 18b further includes, in addition to the configuration shown in FIG. 3: a distance calculation unit 24 that calculates a distance from the vehicle to a position on an actual space corresponding to synchronized pixels (or a synchronized pixel group) based on a positional variation amount calculated by a positional variation calculation unit 21; and a distance estimation unit 26 that estimates a distance from the vehicle to the traffic light, based on an estimated position of the vehicle and the position of the traffic light on a map. Also, the signal lamp determination unit 22 further includes a detection region setting unit 27.

The distance calculation unit 24 uses a motion stereo method to calculate a distance to the position on the actual space corresponding to synchronized pixels, based on a positional variation amount of the synchronized pixels. The motion stereo method is a method for estimating a distance by obtaining an optical flow from continuous images. When one camera moves, a distance to a subject can be calculated based on "movement on a screen" of the subject on continuous images taken at minute time intervals and "displacement of a shooting position".

The distance estimation unit 26 uses the positional information of the traffic light and the information of the current position of the vehicle transferred from the map database 16 and the own vehicle position measurement unit 19, as the estimated position of the vehicle and the position of the traffic light on the map. For example, when there are a plurality of traffic lights at an intersection, a distance can be estimated for each of the traffic lights. Note that, to simplify the information processing, a single distance may be set for a plurality of traffic lights belonging to one intersection. Moreover, the traffic light is assumed to be one closest to the own vehicle on a lane where the own vehicle travels.

The signal lamp determination unit 22 determines the signal lamp candidate from the synchronized pixels at the distance calculated by the distance calculation unit 24, which is longer than the distance estimated by the distance estimation unit 26. When the synchronized pixels generated by the synchronized image generation unit 15 are the moved portion of the brightness edge, continuously extracted positions of the synchronized pixels are not stable, and a variation amount between the synchronized images (synchronized image extraction cycle) is relatively large. Since a large variation amount leads to a large disparity, the distance calculation unit 24 calculates a distance shorter than the actual one to the position on the actual space corresponding to the synchronized pixels. Thus, when the distance to the position on the actual space corresponding to the synchronized pixels is shorter than the distance to the traffic light on the map, the synchronized pixels can be determined to be the moved portion of the brightness edge, and thus can be excluded from the signal lamp candidate.

Furthermore, the signal lamp determination unit 22 may determine the signal lamp candidate from the synchronized pixels farther than a distance that can be calculated by the distance calculation unit 24.

The signal lamp determination unit 22 includes a detection region setting unit 27 that sets a detection region, within a synchronized image, for determining a signal lamp candidate. The signal lamp determination unit 22 determines the signal lamp candidate among the synchronized pixels in the set detection region.

For example, the detection region setting unit 27 sets a threshold height on the image, based on the distance estimated by the distance estimation unit 26 and a height of a signal lamp portion of the traffic light from the ground. The signal lamp determination unit 22 determines the signal lamp candidate from a detection region at or above the threshold height within the synchronized image. By putting a restriction in the height direction on the range of the synchronized image to be extracted, determination efficiency of the signal lamp candidate is improved. Thus, fast detection of the traffic light can be realized.

Furthermore, the distance calculation unit 24 may calculate a direction from the vehicle to the position on the actual space corresponding to the synchronized pixels. In this case, the detection region setting unit 27 can set the detection region within the synchronized image, based on the direction calculated by the distance calculation unit 24. The signal lamp determination unit 22 can detect the traffic light from the set detection region.

With reference to FIG. 9, description is given of an example of a traffic light detection method using the traffic light detection device shown in FIG. 7. To be more specific, description is given of an example of a series of information processing cycles for detecting a traffic light from an image, which is executed by the image processing unit 12 shown in FIG. 7. The information processing cycle shown in a flowchart of FIG. 9 is started as an ignition switch of the vehicle is turned on and the traffic light detection device is started, and is repeatedly executed with a predetermined period until the traffic light detection device is stopped. Differences from FIG. 6 are mainly described.

The same processing as that of FIG. 6 is executed from Step S01 to Step S09. Thereafter, the processing advances to Step S21 where the distance calculation unit 24 uses the motion stereo method to calculate a distance from the vehicle to a position on an actual space corresponding to a synchronized pixel group, based on the positional variation amount of the synchronized pixels. Then, in Step S23, the distance estimation unit 26 estimates a distance from the vehicle to the traffic light, based on the estimated position of the vehicle and the position of the traffic light on the map.

Thereafter, in Step S25, the signal lamp determination unit 22 determines whether or not the distance calculated by the distance calculation unit 24 is longer than the distance estimated by the distance estimation unit 26. If the calculated distance is longer than the estimated distance (YES in S25), the synchronized pixel group is likely to be the signal lamp, and thus the processing advances to Step S11. On the other hand, if the calculated distance is not longer than the estimated distance (NO in S25), the synchronized pixel group can be determined to be the moved portion of the brightness edge. Thus, the processing advances to Step S17 to exclude the synchronized pixel group from the signal lamp candidate. Thereafter, the processing advances to Step S19.

The same processing as that of FIG. 6 is executed from Step S11 to Step S17.

As described above, the second embodiment can achieve the following advantageous effects.

When the synchronized pixels generated by the synchronized image generation unit 15 correspond to the moved portion of the brightness edge, the continuously extracted positions of the synchronized pixels are not stable, and a variation amount between the synchronized images (synchronized image extraction cycle) is relatively large. When the variation amount is large, the distance calculation unit 24 calculates a distance shorter than the actual one to the position on the actual space corresponding to the synchronized pixels. Thus, when the distance to the position on the actual space corresponding to the synchronized pixels is shorter than the distance to the traffic light on the map, the synchronized pixels can be determined to be the moved portion of the brightness edge, and thus can be excluded from the signal lamp candidate. Therefore, the signal lamp can be accurately detected.

The signal lamp determination unit 22 determines a signal lamp candidate among the synchronized pixels farther than a distance that can be calculated by the distance calculation unit 24. Thus, the moved portion of the brightness edge is prevented from being erroneously determined as the signal lamp.

The signal lamp determination unit 22 may set a threshold height on the synchronized image, based on the distance estimated by the distance estimation unit 26 and a height of a signal lamp portion of the traffic light from the ground, and determine the signal lamp candidate from a detection region at or above the threshold height within the synchronized image. Thus, by putting a restriction in the height direction on the range of the synchronized image to be extracted, determination efficiency of the signal lamp candidate is improved. Thus, fast detection of the traffic light can be realized.

The traffic light detection unit 18b may set a detection region within the synchronized image, based on the direction calculated by the distance calculation unit 24, and detect the traffic light from the detection region. By putting a direction restriction on the range of the synchronized image to be extracted, extraction efficiency of the synchronized pixels is improved. Thus, the traffic light can be efficiently detected.

While the embodiments of the present invention have been described above, it should be understood that the description and drawings constituting a part of this disclosure do not limit the present invention. From this disclosure, various alternative embodiments, examples, and operating techniques will become apparent to those skilled in the art.

REFERENCE SIGNS LIST 11 image pickup unit
12 image processing unit
14 synchronized pixel group setting unit
15 synchronized image generation unit (synchronized pixel extraction unit)
16 map database
19 own vehicle position measurement unit
18a, 18b traffic light detection unit
21 positional variation calculation unit 22 signal lamp determination unit
23 threshold value setting unit
24 distance calculation unit
26 distance estimation unit
27 detection region setting unit
28 taken image (frame)

The invention claimed is:

1. A traffic light detection device comprising:
    a camera that is mounted on a vehicle to acquire images by taking images of surroundings of the vehicle; and
    a controller programmed to:
        extract synchronized pixels, whose brightness changes in synchronization with an alternating current period of electric power supplied to a traffic light, from the images; and
        detect the traffic light from the synchronized pixels;
        calculate positional variation amounts of continuously extracted positions of the synchronized pixels, and
        determine, as a signal lamp candidate, the synchronized pixels whose positional variation amount is equal to or smaller than a threshold value.

2. The traffic light detection device according to claim 1, wherein the controller is further programmed to:
    set a plurality of synchronized pixels detected within a predetermined region as one synchronized pixel group, wherein calculating positional variation amounts includes calculating
    a variation amount of a position of a center of gravity of the synchronized pixel group, as the positional variation amount.

3. The traffic light detection device according to claim 2, wherein the controller is programmed to set a plurality of adjacent synchronized pixels as the one synchronized pixel group.

4. The traffic light detection device according to claim 2, wherein the controller is programmed to adjust the threshold value according to an area of the synchronized pixel group.

5. The traffic light detection device according to claim 1, wherein, when the synchronized pixels whose positional variation amount is equal to or smaller than the threshold value are continuously extracted for a threshold time or more, the controller is programmed to determine the synchronized pixels as the signal lamp candidate.

6. The traffic light detection device according to claim 1, wherein the controller is further programmed to:
    calculate a distance from the vehicle to a position on an actual space corresponding to the synchronized pixels, based on the positional variation amount; and
    estimate a distance from the vehicle to the traffic light, based on an estimated position of the vehicle and a position of the traffic light on a map, and
    determine the signal lamp candidate from the synchronized pixels at the distance calculated, which is longer than the distance estimated.

7. The traffic light detection device according to claim 6, wherein the controller is programmed to determine the signal lamp candidate from the synchronized pixels farther than a distance that can be calculated by the controller.

8. The traffic light detection device according to claim 6, wherein the controller is programmed to set a threshold height on the image, based on the distance estimated and a height of a signal lamp portion of the traffic light from a ground, and determine the signal lamp candidate from a detection region at or above the threshold height within the image.

9. The traffic light detection device according to claim 6, wherein the controller is programmed to:
    calculate a direction from the vehicle to the position on the actual space corresponding to the synchronized pixels, and
    set a detection region within the image based on the direction calculated, and detect the traffic light from the detection region.

10. A traffic light detection method comprising:
    acquiring images by taking images of surroundings of a vehicle with a camera mounted on the vehicle;
    extracting synchronized pixels, whose brightness changes in synchronization with an alternating current period of electric power supplied to a traffic light, from the images;
    calculating positional variation amounts of continuously extracted positions of the synchronized pixels;
    extracting the synchronized pixels whose positional variation amount is equal to or smaller than a threshold value, as a signal lamp candidate; and
    detecting the traffic light from the signal lamp candidate.

* * * * *